(12) United States Patent
Wuestenberg (10) Patent No.: US 11,060,419 B2
(45) Date of Patent: Jul. 13, 2021

(54) PLANETARY GEAR DRIVE AND AIRCRAFT GAS TURBINE WITH A PLANETARY GEAR DRIVE

(71) Applicant: Rolls-Royce Deutschland Ltd & Co KG, Blankenfelde-Mahlow (DE)

(72) Inventor: Hannes Wuestenberg, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 147 days.

(21) Appl. No.: 16/425,246

(22) Filed: May 29, 2019

(65) Prior Publication Data
US 2020/0003078 A1    Jan. 2, 2020

(30) Foreign Application Priority Data

Jun. 28, 2018 (DE) ...................... 10 2018 115 617.0

(51) Int. Cl.
| | | |
|---|---|---|
| *F01D 25/28* | (2006.01) | |
| *F01D 25/34* | (2006.01) | |
| *F02C 7/36* | (2006.01) | |
| *F16H 57/025* | (2012.01) | |

(Continued)

(52) U.S. Cl.
CPC ............ *F01D 25/28* (2013.01); *F01D 25/34* (2013.01); *F02C 7/36* (2013.01); *F16H 57/025* (2013.01); *F16H 57/08* (2013.01); *F05D 2220/323* (2013.01); *F05D 2230/60* (2013.01); *F05D 2260/31* (2013.01); *F05D 2260/40311* (2013.01); *F16H 2057/02039* (2013.01)

(58) Field of Classification Search
CPC .......... F01D 25/28; F02C 7/36; F16H 1/2818; F16H 57/025; F16H 57/08; F05D 2260/31; F05D 2260/40311
See application file for complete search history.

(56) References Cited

U.S. PATENT DOCUMENTS

| | | |
|---|---|---|
| 4,468,985 A | 9/1984 | Nilsson |
| 5,433,674 A | 7/1995 | Sheridan et al. |
| 10,066,734 B2 * | 9/2018 | Sheridan ............. F16H 57/0486 |

(Continued)

FOREIGN PATENT DOCUMENTS

| | | |
|---|---|---|
| DE | 2850099 A1 | 5/1979 |
| WO | 2016151236 A1 | 9/2016 |

OTHER PUBLICATIONS

German Search Report dated Mar. 15, 2019 for counterpart German Patent Application No. 10 2018 115 617.0.

*Primary Examiner* — Woody A Lee, Jr.
*Assistant Examiner* — Brian O Peters
(74) *Attorney, Agent, or Firm* — Shuttleworth & Ingersoll, PLC; Timothy J. Klima (57) ABSTRACT

The invention relates to a planetary gearbox having a ring gear support, in particular in a geared fan engine, characterized by a bolt connection for connecting the ring gear support to a static component, wherein the bolt connections are arranged on the circumference of the ring gear support in the axial direction of the planetary gearbox, and the bolt connections are designed and arranged in such a way that there is a frictional joint with a defined frictional force between the ring gear support and the static component and that a material separation, in particular a gap, is arranged between the ring gear support and the static component.

16 Claims, 4 Drawing Sheets

(51) Int. Cl.
*F16H 57/08* (2006.01)
*F16H 57/02* (2012.01)

(56) References Cited

U.S. PATENT DOCUMENTS

| | | |
|---|---|---|
| 10,274,047 B2 * | 4/2019 | Matsuoka ............... F16H 57/08 |
| 2018/0023676 A1 | 1/2018 | Durling |
| 2018/0073384 A1 | 3/2018 | Bordini et al. |

* cited by examiner

PLANETARY GEAR DRIVE AND AIRCRAFT GAS TURBINE WITH A PLANETARY GEAR DRIVE

This application claims priority to German Patent Application DE102018115617.0 filed Jun. 28, 2018, the entirety of which is incorporated by reference herein.

The present disclosure relates to a planetary gearbox and to an aircraft gas turbine having features as disclosed herein.

The use of planetary gearboxes to transmit high torques is known. An exemplary use is a geared fan engine for an aircraft, in which the planetary gearbox is used to reduce the driving speed of a turbine to enable the fan to be driven at a lower speed. The planetary gearbox, which is of epicyclic construction with a fixed ring gear, must therefore be secured on a static part, wherein the connection breaks in a defined manner in the event of an overload, i.e. the connection has a mechanical safety device.

This addresses a planetary gearbox having the features as disclosed as disclosed herein.

In this case, the planetary gearbox, in particular in a geared fan engine, has a ring gear support.

A bolt connection is used to connect the ring gear support to a static component (casing), wherein the bolt connections are arranged on the circumference of the ring gear support in the axial direction of the planetary gearbox, and the bolt connections are designed and arranged in such a way that there is a frictional joint with a defined frictional force between the ring gear support and the static component and that there is a material separation, in particular a gap (channel) is arranged, between the ring gear support and the static component.

Owing to the contact pressure, the bolt connections form a defined frictional force. At a definable torque overload, the entire device slips in the direction of revolution; there is a type of slipping clutch. In the event of failure, the gap allows the movement of the bolt connections without the bolts shearing. When the overload is past, the frictional joint re-engages. Even if the bolt connections have to be preloaded again under some circumstances, there is no failure of part of the frictional joint in operation.

In one embodiment, the static component and/or the ring gear support have/has a flange, wherein bolt connections are passed through the flanges in the axial direction and the flanges are part of the frictional joint. The flanges form rests for other parts, which are described in greater detail below.

In this case, the connection between the ring gear support and the static component is accomplished, in particular, by frictional engagement.

To create a secure frictional joint, it is expedient if an annular covering device at least partially surrounds the bolt connections axially on one side. In this case, the covering device may be of substantially U-shaped design, i.e. it covers one side of the bolt connections by means of the "U". Here, at least one arm of the covering device is connected by the frictional joint to the ring gear support and/or the static component. In another embodiment, the covering device has openings at the base of the U shape for mounting the bolt connections.

It is furthermore possible for a backing ring having through holes for the bolt connections to be arranged within the covering device parallel to at least one of the flanges. These through holes ensure the bolt connections are spaced apart. Instead of being determined by the ring, a spacing can also be determined exclusively by one of the flanges.

The gap may be formed by a part of the static component, in particular the second flange, and a part of the covering device, i.e. it is bounded by these parts, in the circumferential direction, for example. In this case, the bolt connections are passed through the gap, with the result that the bolt connections, in particular, can move in the circumferential direction in the gap when an applied torque is higher than the slipping torque of the frictional joint. There is then no movement in the axial direction. In particular, the static component may be a fastening device for the ring gear support.

In one embodiment, the frictional joint between the static component and the ring gear support may have a slipping torque 1.5 to 4 times, in particular 3 to 4 times, the maximum torque of the gearbox, in particular the maximum torque of a geared fan engine during takeoff.

In one embodiment, the bolt connections may be preloaded. The preload may be in the range between 10 and 150 Nm.

For gearboxes of typical construction, between 40 and 140 bolt connections, in particular between 70 and 110 bolt connections, may be provided.

In this case, the bolts of the bolt connections may have a nominal diameter in the range of from 0.3 to 2 cm, in particular between 0.5 and 1.5 cm, for example.

The object is also achieved by a gas turbine engine having features as disclosed herein.

As noted elsewhere herein, the present disclosure may relate to a gas turbine engine, e.g. an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be particularly, although not exclusively, beneficial for geared fans, which are driven via a gearbox. Accordingly, the gas turbine engine can comprise a gearbox which is driven via the core shaft and the output of which drives the fan in such a way that it has a lower speed than the core shaft. The input to the gearbox may be directly from the core shaft, or indirectly via the core shaft, for example via a spur shaft and/or gear. The core shaft may be rigidly connected to the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gearbox may be designed to be driven by the core shaft that is configured to rotate (for example in use) at the lowest rotational speed (for example the first core shaft in the example above). For example, the gearbox may be designed to be driven only by the core shaft that is configured to rotate (for example in use) at the lowest rotational speed (for example only by the first core shaft, and not the second core shaft, in the example above). Alternatively, the gearbox may be designed to be driven by one or more shafts, for example the first and/or second shaft in the example above.

In any gas turbine engine as described and/or claimed herein, a combustor may be provided axially downstream of the fan and compressor or compressors. For example, the combustor may be directly downstream of (for example at the exit of) the second compressor, where a second compressor is provided. By way of further example, the flow at the exit to the compressor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (i.e. the angle of incidence may be variable). The row of rotor blades and the row of stator vanes may be axially offset with respect to each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset with respect to each other.

Each fan blade may have a radial span extending from a root (or hub) at a radially inner gas-washed location, or from a 0% span position, to a tip with a 100% span position. The ratio of the radius of the fan blade at the hub to the radius of the fan blade at the tip may be less than (or on the order of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by two values in the previous sentence (i.e. the values may form upper or lower bounds). These ratios may commonly be referred to as the hub-to-tip ratio. The radius at the hub and the radius at the tip may both be measured at the leading edge (or axially forwardmost edge) of the blade. The hub-to-tip ratio refers, of course, to the gas-washed portion of the fan blade, i.e. the portion radially outside any platform.

The radius of the fan may be measured between the engine centreline and the tip of the fan blade at its leading edge. The fan diameter (which may generally be twice the radius of the fan) may be greater than (or on the order of) any of the following: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) or 390 cm (around 155 inches). The fan diameter may be in an inclusive range bounded by any two of the values in the previous sentence (i.e. the values may form upper or lower bounds).

The rotational speed of the fan may vary in operation. Generally, the rotational speed is lower for fans with a larger diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at the leading edge multiplied by angular speed). The fan tip loading at cruise conditions may be greater than (or on the order of) any of the following: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17.0, 17.5 or 18. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off thrust (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which is manufactured using a material that is better able to resist impact (for example from birds, ice or other material) than the rest of the blade. Such a leading edge may, for example, be manufactured using titanium or a titanium based alloy. Thus, purely by way of example, the fan blade may have a carbon-fibre or aluminium based body (such as an aluminium-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disk). Purely by way of example, such a fixture may be in the form of a dovetail that may slot into and/or engage a corresponding slot in the hub/disk in order to fix the fan blade to the hub/disk. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disk by welding, such as linear friction welding.

The gas turbine engines described and/or claimed herein may or may not be provided with a variable area nozzle (VAN). Such a variable area nozzle may allow the exit area of the bypass duct to be varied in operation. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise condition may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to the following: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In operation, a gas turbine engine described and/or claimed herein may operate at the cruise conditions defined elsewhere herein. Such cruise conditions may be determined by the cruise conditions (for example the mid-cruise conditions) of an aircraft to which at least one (for example two or four) gas turbine engine(s) may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example, with reference to the figures, in which.

Figure 1:
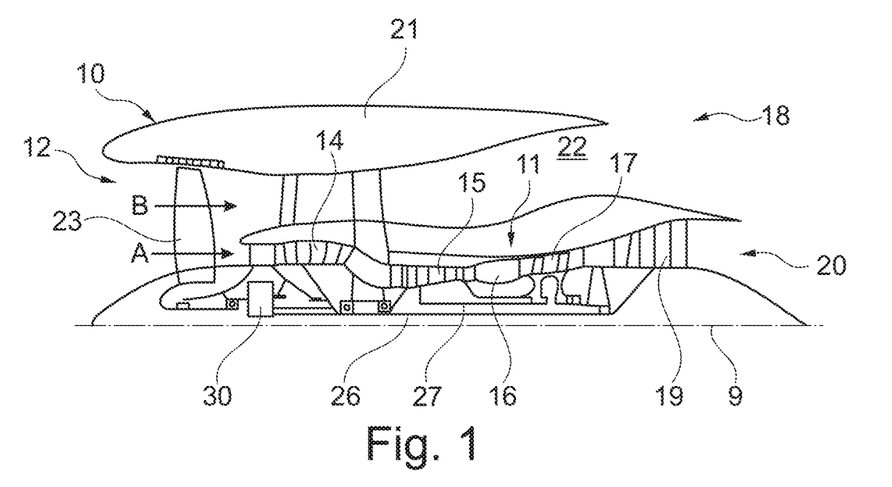
FIG. 1 is a sectional side view of a gas turbine engine.

FIG. 1 illustrates a gas turbine engine 10 having a principal rotational axis 9. The gas turbine engine 10 comprises an air intake 12 and a fan 23 that generates two airflows: a core airflow A and a bypass airflow B. The gas turbine engine 10 comprises a core 11 that receives the core airflow A. When viewed in the order corresponding to the axial direction of flow, the core engine 11 comprises a low pressure compressor 14, a high pressure compressor 15, a combustion device 16, a high pressure turbine 17, a low pressure turbine 19 and a core thrust nozzle 20. A nacelle 21 surrounds the gas turbine engine 10 and defines a bypass duct 22 and a bypass thrust nozzle 18. The bypass airflow B flows through the bypass duct 22. The fan 23 is attached to and driven by the low pressure turbine 19 via a shaft 26 and an epicyclic planetary gearbox 30.

In operation, the core airflow A is accelerated and compressed by the low pressure compressor 14 and directed into the high pressure compressor 15 where further compression takes place. The compressed air exhausted from the high pressure compressor 15 is directed into the combustion device 16, where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic planetary gearbox 30 is a reduction gearbox.

Figure 2:
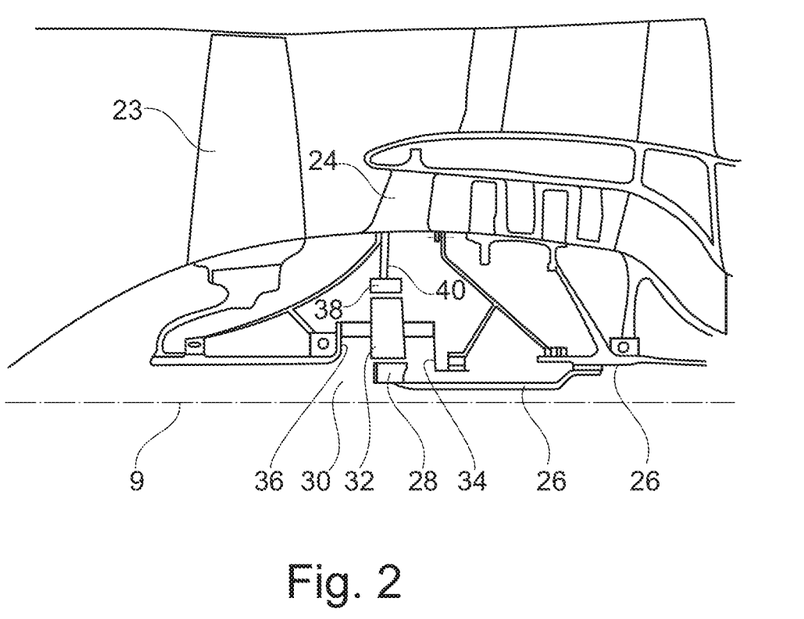
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun gear 28 of the epicyclic planetary gearbox 30. Radially outwardly of the sun gear 28 and intermeshing therewith is a plurality of planet gears 32 that are coupled together by a planet carrier 34. The planet carrier 34 guides the planet gears 32 in such a way that they precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
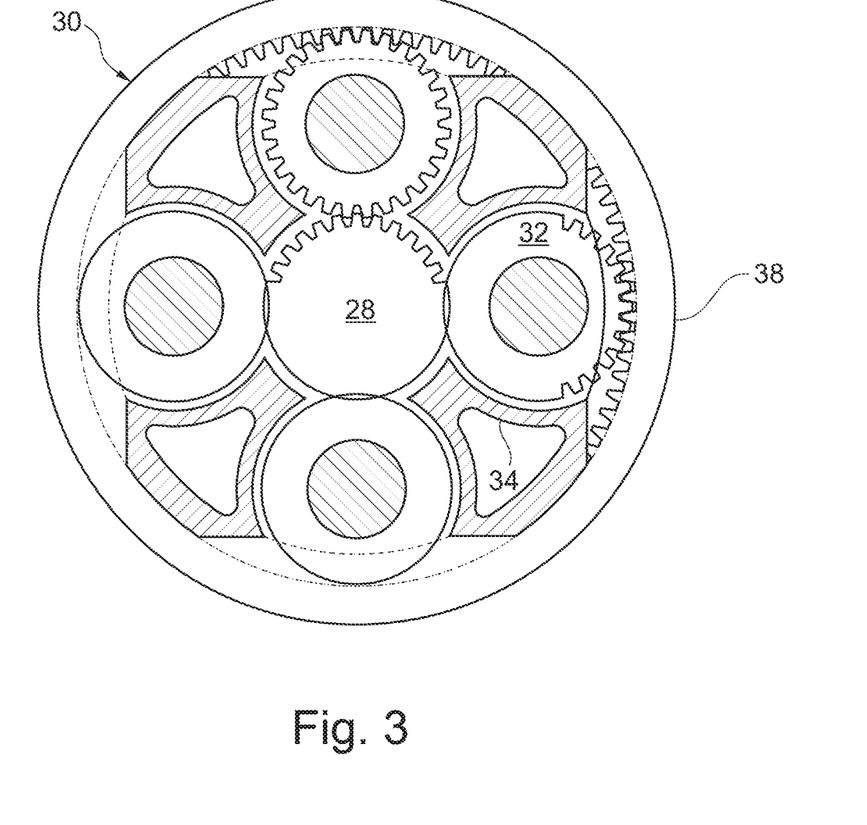
FIG. 3 is a partially cut-away view of a gearbox for a gas turbine engine.

The epicyclic planetary gearbox 30 is shown by way of example in greater detail in FIG. 3. Each of the sun gear 28, planet gears 32 and ring gear 38 comprise teeth on their periphery to allow intermeshing with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of an epicyclic planetary gearbox 30 generally comprise at least three planet gears 32. The epicyclic planetary gearbox 30 illustrated by way of example in FIGS. 2 and 3 is a planetary gearbox in which the planet carrier 34 is coupled to an output shaft via linkages 36, with the ring gear 38 fixed. However, any other suitable type of planetary gearbox 30 may be used. By way of further example, the planetary gearbox 30 may be a star arrangement, in which the planet carrier 34 is held fixed, with the ring gear (or annulus) 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the gas turbine engine 10 and/or for connecting the gearbox 30 to the gas turbine engine 10. By way of further example, the connections (such as the linkages 36, 40 in the FIG. 2 example) between the gearbox 30 and other parts of the gas turbine engine 10 (such as the input shaft 26, the output shaft and the fixed structure 24) may have a certain degree of stiffness or flexibility. By way of further example, any suitable arrangement of the bearings between rotating and stationary parts of the gas turbine engine 10 (for example between the input and output shafts of the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or epicyclic-planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is or are defined by a conventional axis system, comprising an axial direction (which is aligned with the rotational axis 9), a radial direction (in the bottom-to-top direction in FIG. 1), and a circumferential direction (perpendicular to the view in FIG. 1). The axial, radial and circumferential directions are mutually perpendicular.

Embodiments of planetary gearboxes 30 that are connected to the static part 40 of a gas turbine engine 10 are described below.

On the one hand, this connection must be sufficiently stable to withstand the high torques. In a geared fan engine 10, the torques to be transmitted may be well above 100 kNm for example, e.g. over 250 kNm.

On the other hand, it must be possible for the connection to be released, i.e. to fail, in a defined manner when there is an overload, e.g. due to a gearbox failure, to ensure that the gas turbine engine 10 (here designed as a geared fan engine) as a whole does not suffer any damage or at least suffers as little damage as possible.

Figure 4:
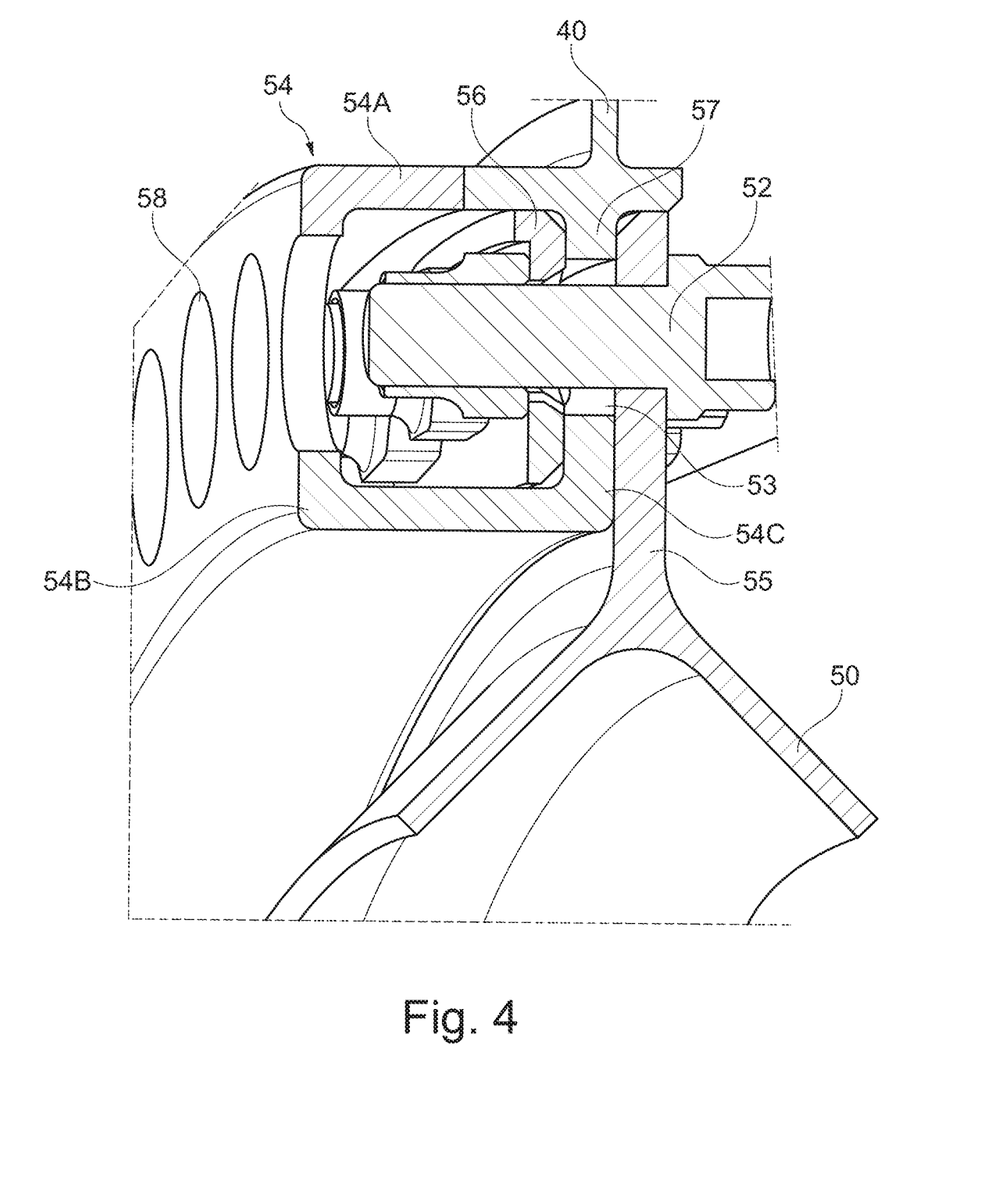
FIG. 4 is a section through a fastening of an embodiment of a planetary gearbox on a static component by means of a slipping clutch.

A sectional view of the region in which the gearbox 30 is connected to a static component 40 of the aircraft engine 10 is illustrated in FIG. 4. The static component 40 may be coupled to a fixed part of the gas turbine engine 10, for example. The illustration particularly of the static component 40 should be interpreted as purely illustrative here since the static component 40 may be configured differently, depending on the installation position of the gearbox 30.

Of the gearbox 30 itself, only the ring gear support 50 is shown in FIG. 4. In the embodiment illustrated, a planet gear with two flanks 32 arranged in parallel, which are not illustrated here for reasons of clarity (see FIGS. 2 and 3) revolve in the ring gear 38 (i.e. below the sectioned ring gear support in FIG. 4).

An annular flat first flange 55, which faces radially outward, is arranged centrally on the outer circumference of the ring gear support 50.

In the case of a typical diameter of a planetary gearbox 30 in a gas turbine engine 10, the diameter of the first flange 55 is on the order of one meter, e.g. between 80 cm and 130 cm. In principle, larger or smaller diameters of the gearbox 30 are of course also possible, depending on the construction of the gas turbine engine 10.

The mechanical safety device in the form of a slipping clutch has bolt connections 52, which connect the planetary gearbox 30 and the static component 40 frictionally to each other, in particular exclusively by frictional engagement.

The bolt connections 52 are arranged on the outer circumference of the ring gear support 50, more specifically in the axial direction. In the case of the typical diameters of a planetary gearbox 30, between 60 and 120, in particular between 80 and 100, bolt connections 52 may be provided. Here, the bolts of the bolt connection 52 may be designed in accordance with 0.4375-20UNJF-3A (Standard SAE AS8879B-2001), for example.

FIG. 4 illustrates that the bolt connections 52 are connected on the right-hand side to the first flange 55. All the other parts which are described below are connected frictionally to the first flange 55 by the bolt connections 52.

In this embodiment, the static component 40 is the "ring gear mount" 40, which here has an annular second flange 57.

The bolt connections 52 press the second flange 57 of the static component 40 together with the first flange 55 of the ring gear support 50, wherein there is additionally a backing ring 56 arranged in the frictional joint on one side of the bolt connection 52 (on the left-hand side in FIG. 4), said ring forming a contact body with the second flange 57 of the static part 40. The ring 56 has through holes for the bolt connections 52. The ring 56 is otherwise not connected materially to any other part of the static component 40.

Moreover, there is a material separation between the ring gear support 50 and the static component 40, said separation in this case being designed especially as a gap (channel) 53 in the circumferential direction. The gap 53 can be seen more clearly in FIG. 5. In this view, the first flange 55 and the ring 56 have been omitted for reasons of clarity, allowing parts of the bolt connections 52 to be seen in the gap 53.

One outer side of the bolt connection 52, the left-hand side in FIG. 4, is surrounded by a covering device 54, which is here of U-shaped design.

One arm 54A of the covering device 54, the radially outer arm in FIG. 4, is connected to the static component 40, e.g. by a weld seam.

The other arm 54B, the radially inner arm in FIG. 4, has an offset 54C, which is bent radially outward and is arranged between the ring 56 and the first flange 55 and forms a part of the friction surface. This can be seen in FIG. 5 since there it is possible to see one friction surface, formed by the offset 54C and the second flange 57.

The bolt connections 52 thus clamp the flanges 55, 57 frictionally together, wherein the ring 56 and one part of the covering device 54 are part of the clamped assembly, there being a frictional joint between the parts.

In this case, the load path is split, starting from the ring gear support 50. One path leads via the offset 54C, and the other leads via the outer part of the first flange 55, via the second flange 57 on the static part into the static component 40.

Here, the clamping forces of the bolt connections 52 are chosen so that the frictional joint is established between the static component 40 and the ring gear support 50. The frictional joint forms a kind of mechanical slipping clutch, wherein the slipping torque corresponds to 1.5 to 4 times, in particular 2 to 3 times, the maximum torque of the gearbox 30. The slipping torque depends on the preload of the multiplicity of bolt connections 52. In the case of a geared fan engine 10, the maximum torque is reached during takeoff. The slipping torque may be in a range between 300 to 1000 kNm, in particular in the region of 500 kNm.

By virtue of this configuration, in particular the gap 53 in the circumferential direction, the bolts of the bolt connections 52 are not subject to shear stress. If an overload occurs, all the bolt connections 52 slip as a whole relative to the static component 40, said connections being held at fixed spacings by the ring 56. The bolt connections 54 remain intact and therefore a frictional joint is once again present after the overload.

The base of the U-shaped covering device 54 has openings 58 in the axial direction (in FIG. 4), through which bolts and/or nuts of the bolt connections 52 can be introduced for assembly.

During the assembly of the bolt connections 52, the second arm 54B of the covering device 54 can be clamped to the offset 54C, e.g. after the insertion of the bolts into the first flange 55. The upper arm 54A can then be welded to the static component 40 by means of a peripheral seam.

Figure 5:
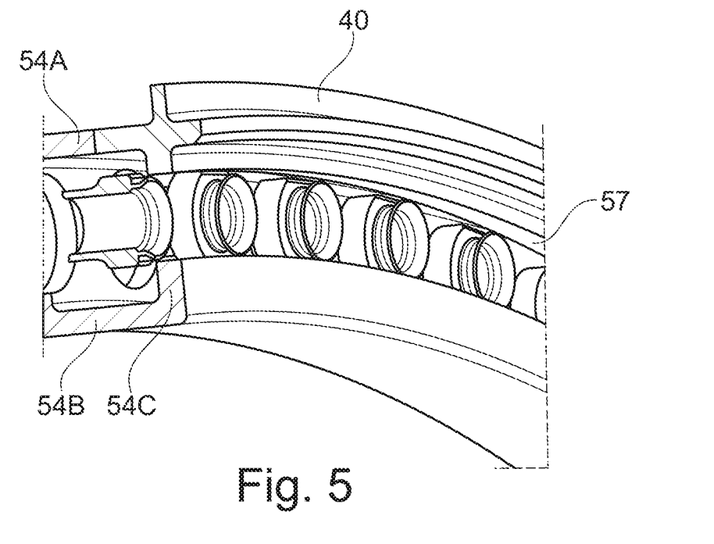
FIG. 5 is a detail view of the embodiment shown in FIG. 4 without a flange of the planetary gearbox.
Figure 6:
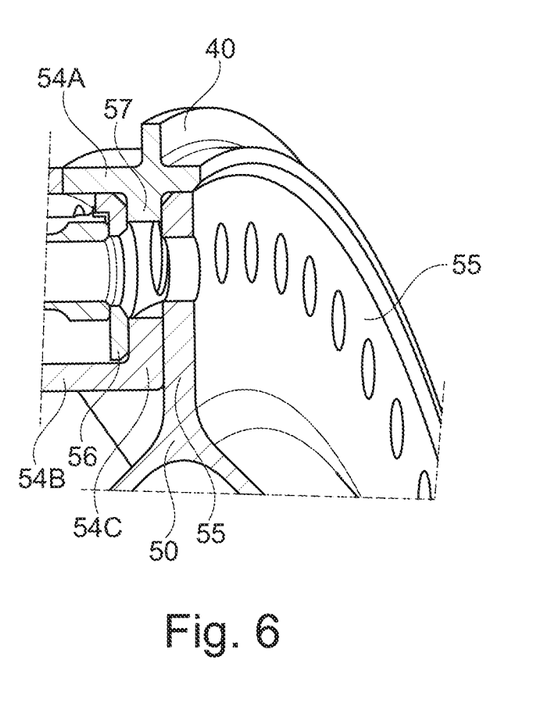
FIG. 6 is another sectional view of the slipping clutch according to the embodiment in FIG. 4.
Figure 7:
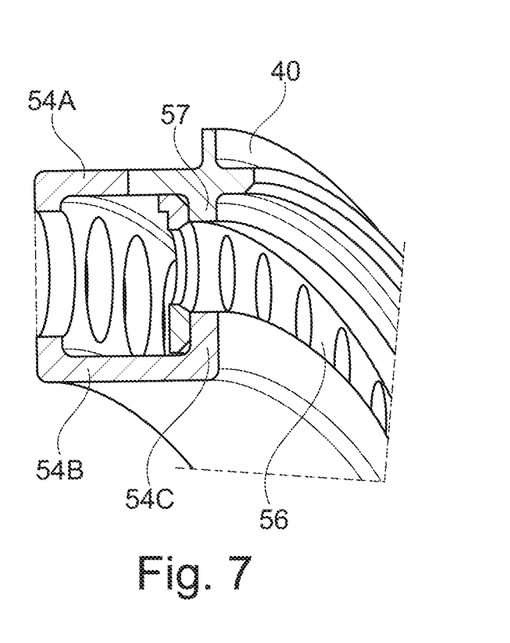
FIG. 7 is another sectional view of the slipping clutch without the flange of the planetary gearbox.

FIG. 6 essentially shows the segment in FIG. 5 (without the bolts of the bolt connections 52), wherein the angle of view is toward the right-hand side of the first flange 55. In FIG. 7, the ring 56 which delimits the gap 54 axially on one side is illustrated from a similar perspective from the right-hand side.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

LIST OF REFERENCE SIGNS

9 Principal rotational axis
10 Gas turbine engine, aircraft engine
11 Core engine
12 Air intake
14 Low pressure compressor
15 High pressure compressor
16 Combustion device
17 High pressure turbine
18 Bypass thrust nozzle
19 Low pressure turbine
20 Core thrust nozzle
21 Nacelle
22 Bypass duct
23 Fan
24 Stationary supporting structure
26 Shaft
27 Interconnecting shaft
28 Sun gear
30 Gearbox
32 Planet gears
34 Planet carrier
36 Linkage
38 Ring gear
40 Static component (ring gear mount)
50 Ring gear support
52 Bolt connection
53 Gap
54 Covering device
55 First flange on ring gear support
56 Ring
57 Second flange on static part
58 Openings
A Core airflow
B Bypass airflow

The invention claimed is:

1. A planetary gearbox having a ring gear support, for a geared fan engine, comprising:
a plurality of bolt connections connecting the ring gear support to a static component, wherein the bolt connections are arranged around a circumference of the ring gear support to extend in an axial direction of the planetary gearbox,
the bolt connections configured and arranged to engage at least one backing ring to clamp the ring gear support and the static component together in the axial direction to form a circumferential frictional joint with a defined frictional force between the ring gear support and the static component,
a circumferentially extending channel positioned adjacent to the ring gear support and/or the static component such that the bolt connections axially pass through the channel, the channel being open in a circumferential direction such that the bolt connections are movable circumferentially in the channel with respect to the ring gear support and/or the static component upon an overload situation where an applied torque exceeds a slipping torque of the frictional joint.

2. The planetary gearbox according to claim 1, wherein the ring gear support and/or the static component has a flange, through which the bolt connections pass and which is part of the frictional joint.

3. The planetary gearbox according to claim 1, and further comprising an annular covering device which at least partially surrounds the bolt connections axially on one side.

4. The planetary gearbox according to claim 3, wherein the covering device is U-shaped, and includes at least one arm connected to the ring gear support and/or the static component by the frictional joint.

5. The planetary gearbox according to claim 3, wherein the covering device includes openings at a base of the U-shape for mounting the bolt connections.

6. The planetary gearbox according to claim 3, wherein the at least one backing ring includes through holes for the bolt connections, the at least one backing ring arranged within the covering device parallel to a radially extending flange of the ring gear support and/or the static component.

7. The planetary gearbox according to claim 1, wherein, the channel is formed by a part of the static component.

8. The planetary gearbox according to claim 1, wherein the static component connects the ring gear support to a fixed structure of the geared fan engine.

9. The planetary gearbox according to claim 1, wherein the frictional joint between the static component and the ring gear support has a slipping torque 1.5 to 4 times a maximum operational torque of the gearbox.

10. The planetary gearbox according to claim 1, wherein the bolt connections are preloaded.

11. The planetary gearbox according to claim 1, wherein the plurality of bolt connections includes between 40 and 140 bolt connections.

12. The planetary gearbox according to claim 1, wherein bolts of the bolt connections have a nominal diameter in a range of from 0.3 to 2 cm, in particular between 0.5 and 1.5 cm.

13. A gas turbine engine for an aircraft comprising:
a core engine comprising a turbine, a compressor, and a core shaft connecting the turbine to the compressor;
a fan, which is positioned upstream of the core engine, wherein the fan comprises a plurality of fan blades; and
a gearbox, driven by the core shaft, wherein the fan is driven by the gearbox at a lower speed than the core shaft, wherein the gearbox is the planetary gearbox according to claim 1.

14. The planetary gearbox according to claim 1, wherein the frictional joint between the static component and the ring gear support has a slipping torque of 3 to 4 times a maximum operational torque of the gearbox.

15. The planetary gearbox according to claim 1, wherein the plurality of bolt connections includes between 70 and 110 bolt connections.

16. The planetary gearbox according to claim 1, wherein bolts of the bolt connections have a nominal diameter in a range of from 0.5 to 1.5 cm.

* * * * *